United States Patent [19]

Friedheim et al.

[11] 3,883,650

[45] May 13, 1975

[54] TREATMENT OF FILARIASIS
[75] Inventors: Ernst Albert Hermann Friedheim, Genf, Switzerland; Dieter Düwel, Hofheim/Taunus, Germany
[73] Assignee: Hoechst Aktiengesellschaft, Frankfurt am Main, Germany
[22] Filed: July 18, 1972
[21] Appl. No.: 272,726

[30] Foreign Application Priority Data
July 20, 1971 Switzerland.................... 10701/71

[52] U.S. Cl. ................. 424/245; 424/250; 424/297
[51] Int. Cl. ............................................ A61k 27/00
[58] Field of Search .................... 424/245, 249, 250

[56] References Cited
UNITED STATES PATENTS
2,659,723  11/1953  Friedheim ........................... 424/296

FOREIGN PATENTS OR APPLICATIONS
1,670,684   12/1970   Germany

*Primary Examiner*—V. D. Turner
*Attorney, Agent, or Firm*—Curtis, Morris & Safford

[57]  ABSTRACT

The present invention relates to pharmaceutical combination preparations which contain a phenyl-arsenic-dithio compound and a bis-benzimidazole derivative. The combinations of the present invention have a pronounced synergistic action against filariae and other roundworms in animals, insofar as, at the same dosage, they have an increased therapeutic effect as compared to the single components, or the same therapeutic effect can be achieved by substantially decreasing the doses of each of the components.

6 Claims, No Drawings

TREATMENT OF FILARIASIS

The present invention relates to pharmaceutical preparations which contain a phenyl-arsenic-dithio compound of the formula

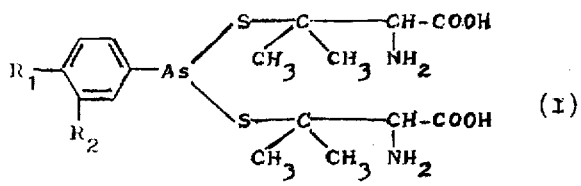

where $R_1$ is —OH or —CO-NH$_2$ or the radical

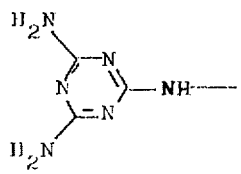

and $R_2$ is hydrogen or the amino group, and a bis-benzimidazole derivative of the formula

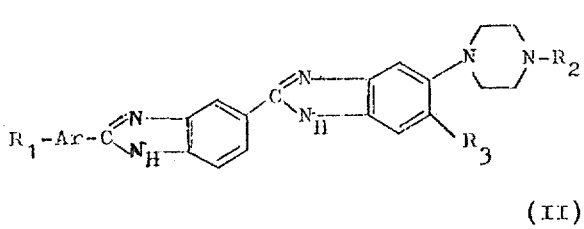

where Ar is an arylene radical; $R_1$ is a hydrogen or halogen atom, a hydroxy, lower alkyl or alkoxy, mercapto or alkylmercapto, alkylenedioxy or nitro group, a phenyl radical or an amino group which may be optionally substituted by alkyl; $R_2$ is hydrogen, an optionally substituted alkyl radical, a carbalkoxy, carbamido, aryl or aralkyl radical; $R_3$ is a halogen atom, a lower alkyl or alkoxy radical; and/or the physiologically tolerable salts thereof.

It is known that phenyl-arsenic-dithio compounds are active against filariae (cf. U.S. Pat. No. 2,659,723). Especially efficient and simultaneously quite well tolerated are compounds of the above formula I (Swiss Pat. application No. 10,701/71). Furthermore, it is known that basically substituted bis-benzimidazole derivatives of the above general formula II are especially active against microfilariae (German Offenlegungschrift No. 1,670,684 published Dec. 3, 1970, and corresponding to U.S. Pat. No. 3,538,097 issued Nov. 3, 1970).

Surprisingly, there has now been found that combinations of compounds of the above formulae I and II have a pronounced synergistic action. Such combinations, at the same dosage, have an increased therapeutic effect as compared to the single components, or the same therapeutic effect can be achieved by substantially decreasing the doses of the compounds of formula I as well as of formula II. The importance of decreasing the doses resides in the fact that the possibility of noxious side effects can be reduced. A considerable increase of activity thus is achieved which cannot be attained in practical therapy by increasing the doses of compounds of formulae I and II, considering the side-effects to be expected.

Especially advantageous properties result from combinations which, as compound of formula I, contain a compound of the formula

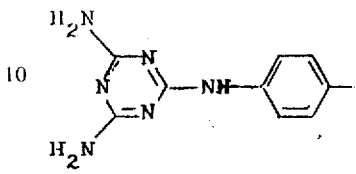

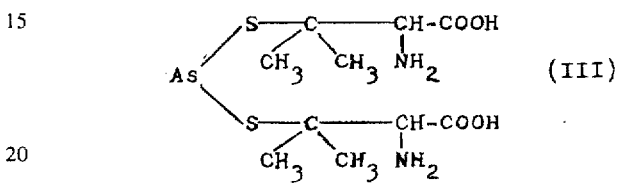

and, as compound of formula II, a compound of the formula

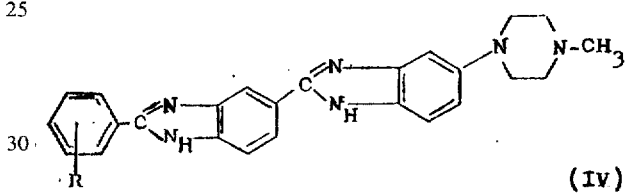

where R is a hydroxy, methoxy or ethoxy group or a chlorine atom, and where the radical R is preferably linked in 4-position to the phenyl radical. An especially pronounced therapeutic effect is attained by combining a compound of the above formula III and a compound of the cited formula IV, in which R is a hydroxy group linked in 4-position to the phenyl radical.

The compounds of the above formulae I and II may be combined within a wide range. Advantageous is a molar ratio of from 5 : 1 to 1 : 5; the molar ratio of compounds of formula I to those of formula II being preferably from 1 : 1.5 to 1 : 3.

Compounds of formula I are used in their free form or as salts, the acid components employed being physiologically tolerable ones. Examples are chloric, bromic or hydriodic acid, sulfuric, amidosulfonic, methylsulfuric, nitric acid, phosphoric acids, formic, acetic, propionic, succinic, tartaric, lactic, malonic, fumaric, citric, malic, mucic, aceturic, benzenesulfonic or hydroxyethanesulfonic acid. The compounds of the above formula I may also be used as base addition salts. Suitable bases for the formation of such salts are for example sodium or potassium hydroxide, and organic bases, such as diethylamine, ethanolamine, 1,6-diaminohexane or methylglucamine. The compounds of formula II are advantageously used in the form of their salts with non-toxic acids. As non-toxic acids, the above acids may be employed. Especially advantageous are the di- and trihydrochlorides of these compounds since they readily dissolve in aqueous media.

The combinations in accordance with the present invention are advantageously employed as aqueous solutions, but it is also possible to administer them as suspensions. The concentration of the aqueous solution may vary within a wide range, for practical reasons, however, it is from 2.5 to 30 percent by weight, preferably from 10 to 15 percent by weight. Parenteral administration is preferred, but the solutions may also be perorally administered.

The dosage depends on the host and on the rate and kind of administration, and it is advantageously from 0.5 to 250 mg of the combination per kg of body weight. Generally, a single administration is sufficient, but the administration may be also repeated once a day or once a week, for example up to 10 times.

The combinations of the invention, besides their action against filariae, of which for example *Litomosoides carinii* and *Dirofilaria immitis* may be cited, are also suitable for combating other roundworms in productive livestock and other domestic animals, and in man.

The mode of preparation of the combination in accordance with the present invention has no influence on the therapeutic effect of these combinations. For example, the preparation may be carried out as follows: a compound of formula I is mixed homogenously with a compound of formula II in the desired molar ratio, and before the application, the desired amount of the compound is dissolved in water, optionally with addition of one of the above acids. It is also possible to dissolve a compound of formula I in a solution of a trihydrochloride of formula II having an acidic reaction and optionally to filter it subsequently. The solution obtained may be dry frozen, and from the dry residue, a clear ready-for-use solution of the combination of both components can be obtained by addition of water. A suitable combination of both components may also be obtained by dissolving a compound of formula I together with a compound of formula II, preferably a trihydrochloride of this compound, in an organic solvent, such as dimethylsulfoxide, and by adding to this clear solution another solvent in which the components are insoluble, for example lower alcohols, such as ethyl or isopropyl alcohol or acetone. From the crystal powder so obtained, a ready-for-use solution may be prepared by addition of water.

Compounds of the above formula I may be prepared by reacting a phenyl-arsenic-oxide of the formula

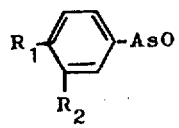

where $R_1$ and $R_2$ are as defined for formula I, with at least the double molar amount of D-penicillamine (Swiss Patent Application No. 10,701/71).

The following examples illustrate the invention. The following compounds have been examined:

II/1 = 2-[2-(4-hydroxy-phenyl)-6-benzimidazolyl]-6-(1-methyl-4-piperazyl)-benzimidazole
II/2 = 2-[2-(4-methoxy-phenyl)-6-benzimidazolyl]-6-(1-methyl-4-piperazyl)-benzimidazole -Continued
II/3 = 2-[2-(4-ethoxy-phenyl)-6-benzimidazolyl]-6-(1-methyl-4-piperazyl)-benzimidazole
II/4 = 2-[2-(4-chloro-phenyl)-6-benzimidazolyl]-6-(1-methyl-4-piperazyl)-benzimidazole.

EXAMPLE 1

The effect of the combinations of the invention is tested on cotton rats which are infested with filariae (*Litomosoides carinii*). The test is carried out in the following manner:

Female cotton rats having a weight of about 50 g are placed for 24 hours in a cylinder containing mites (Bdellonysus bacoti) which as intermediate hosts transmit the cotton rat filariae. The time of the infection depends on the charge of mites in the cylinder; care has to be taken that approximately the same infection rate is always maintained. About 10 weeks after the infection, the subcutaneous treatment begins which may be a single dose or several doses administered in intervals of 24 hours.

The control of the results during the following weeks is carried out by counting the rate of microfilariae in the peripheral blood, which is taken from the caudal vein of the cotton rats (technical tests: W. Raether and W. Meyerhofer, Z. Tropenmed. 18, pp. 99 to 108, 1967). 7 Weeks after the beginning of the therapy, the cotton rats are dissected and the rate of worms in the pleural cavity is examined. The number of living macrofilariae (= puberal worms; microfilariae = their procreation products, agamous larvae) in the treated rats is determined and put in relation to the rate of worms in untreated cotton rats. The decrease of the number of macrofilariae calculated from these data corresponds to the effect of the treatment.

TABLE 1

Preparation of the injection solutions:

The injection solutions are prepared by dissolving compound I/III (in form of the phosphate) or compounds of formula II (in form of the trihydrochloride) in a 10-fold amount of distilled water. The solutions so obtained are subcutaneously administered to the cotton rats in a volume corresponding to the weight of the animals.

TABLE 2

Preparation of the injection solutions:

The cited compounds of formula II in form of their trihydrochlorides are dissolved in water; compound I/III is then added. The molar ratio of compound I/III to compounds II is about 1:2. The solution so obtained is then dry frozen. The dry residue so obtained is dissolved, immediately before the tests, in a 10-fold

I/III = amount by weight of water. The injection solutions are subcutaneously administered in a volume corresponding to the weight of the animals.

Practically the same results are obtained by administering the above compounds as separate injection solutions in an immediately consecutive manner.

A comparison of the results of Tables 1 and 2 illustrates the outstanding effect of the combinations of the invention, which resides above all in the fact that a single administration and a smaller dose result in a superior therapeutic effect than that attained when administering the single components.

open air. In or after the cited observation time (control period), the following criteria determine the success of the treatment:

1. reduction of the number of microfilariae in the peripheral blood as compared to untreated dogs,
2. detection of dead macrofilariae at dissection is equivalent to the killing effect.

The preparations are administered as follows:

I/III as aqueous solution of the phosphate salt,

Table 1

Administration of the cited substances, single.

| Compound | Rate of administration | Dose mg/kg subcutaneously | Total dose | >95% Action against MiFi (1) after — days of treatment* | Action against MaFi (2) |
|---|---|---|---|---|---|
| I/III | 1 × | 15 | 15 | — | no effect |
|  | 5 × | 5 | 25 | — | no effect |
|  | 5 × | 10 | 50 | 28 | > 90% of ♀♀ MaFi dead, ♂♂ living |
| II/1 | 1 × | 35 | 35 | 14 | ~ 50% of ♀♀ MaFi dead, ♂♂ living |
|  | 5 × | 5 | 25 | 14 | no effect |
|  | 5 × | 10 | 50 | 14 | ~ 50% of ♀♀ MaFi dead, ♂♂ living |
|  | 5 × | 50 | 250 | 14 | 100% of ♀♀ MaFi dead, ♂♂ reduce |
| II/2 | 5 × | 5 | 25 | 21 | MaFi living |
|  | 5 × | 30 | 150 | 14 | MaFi living |
| II/3 | 5 × | 5 | 25 | 14 | MaFi living |
|  | 5 × | 20 | 100 | 7 | MaFi living |
| II/4 | 5 × | 5 | 25 | 28 | MaFi living |
|  | 5 × | 30 | 150 | 14 | MaFi living |

MiFi (1) = microfilariae
MaFi (2) = macrofilariae
*= microfilariae up from 35 to 40 days after the therapy found again in the peripheral blood.

Table 2

Administration of the cited substances, in combination.

| Rate of administration | Compound and dose in mg/kg subcutaneously | 95% effect against MiFi after — days of treatment** | Effect against MaFi |
|---|---|---|---|
|  | I/III + II/1 | | |
| 1 × | 15 + 35 | 14 | > 90% of ♀♀ MaFi dead, ♂♂ reduced |
| 1 × | 50 + 100 | 14 | 100% of ♀♀ + ♂♂ MaFi dead |
|  | I/III + II/2 | | |
| 1 × | 15 + 35 | 14 | > 90% of ♀♀ MaFi dead, ♂♂ reduced |
| 1 × | 50 + 100 | 14 | 100% of ♀♀ + ♂♂ MaFi dead |
|  | I/III + II/3 | | |
| 1 × | 15 + 35 | 14 | > 90% of MaFi dead, ♂♂ reduced |
| 1 × | 50 + 100 | 14 | 100% of ♀♀ + ♂♂ MaFi dead |
|  | I/III + II/4 | | |
| 1 × | 15 + 35 | 28 | MaFi living |
| 1 × | 50 + 100 | 14 | 100% of ♀♀ + ♂♂ MaFi dead |

**= microfilariae until dissection date (7 weeks after the therapy) not detected any longer in the peripheral blood.

EXAMPLE 2

The tests listed in the following Tables are carried out on dogs being infested in a natural manner with Dirofilaria immitis; and they are substantially tests in the II/1 as aqueous solution of the trihydrochloride salt,
I/III + II/1 as solution in an aqueous medium.

The concentration of the solution in each case is 10 percent by weight.

Table 3

| Administration of the cited substances, single. | | | | | |
|---|---|---|---|---|---|
| Compound | Rate of administration | Dose mg/kg subcutaneously | Total dose | Control period (days) | Average MiFi effect after — days of treatment | Effect against MaFi |
| I/III | 5 × | 5 | 25 | 42 | no effect | not examined |
| II/1 | 5 × | 2.5 | 12.5 | 42 | 100% beginning 30$^d$ post ther. | no dead MaFi detected |
| | 5 × | 5 | 25 | 42 | 100% beginning 30$^d$ post ther. | |

Table 4

| Administration of the cited substances in combination | | | | | |
|---|---|---|---|---|---|
| Rate of administration | Compound and dose in mg/kg subcutaneously | | | Control period (days) | Average MiFi effect after — days of treatment | Effect against MaFi |
| 1 × | I/III 1.5 | + | II/1* 3.5 | > 100 | 100% beginning 50$^d$ post ther. | Residues of dead worms, some MaFi living |
| 1 × | I/III 10 | + | II/1 15 | > 100 | 100% beginning 10$^d$ post ther. | not examined |
| 1 × | I/III 1.5 | + | II/1** 3.5 | > 100 | 100% beginning 50$^d$ post ther. | Residues of dead worms, some MaFi living |

*administered in one solution
**administered simultaneously, but with local separation

What is claimed is:

1. A pharmaceutical composition for treating filariasis, which comprises, a therapeutically effective amount of a phenylarsenicdithio compound of the formula

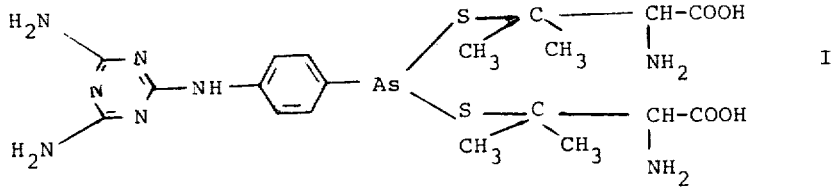

and an effective therapeutic amount of a compound of the formula

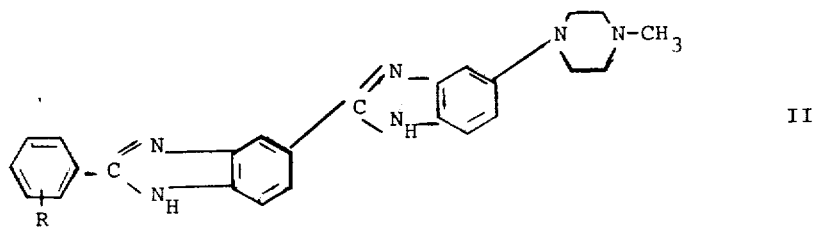

wherein R is hydroxy, methoxy, ethoxy or chlorine or the physiologically tolerable salts thereof, the molar ratio of compound I to compound II being between 1:1.5 and 1:3.

2. The pharmaceutical composition as claimed in claim 1, wherein the salts of the compounds of formulae I and II are the hydro-chloric, hydrobromic, hydroiodic acid, sulfuric, amidosulfonic, methylsulfuric, tartaric, lactic, malonic, fumaric, citric, malic, mucic, aceturic, benzenesulfonic or hydroxyethanesulfonic acid salts.

3. The pharmaceutical composition as claimed in claim 1, dissolved in water.

4. The pharmaceutical composition as claimed in claim 1, wherein the compound of formula II is

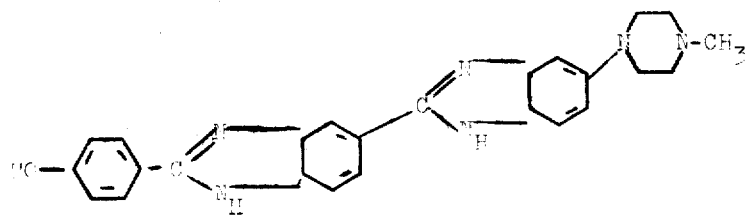

5. A process for treating filariasis in productive livestock or domestic aminals, wherein a composition as claimed in claim 1, is administered in a therapeutically effective dose of from 0.5 to 250 mg of said combination of compounds per kg of body weight.

6. A process for treating filariasis in productive livestock or domestic animals, wherein an aqueous solution of a composition as claimed in claim 5 is parenterally administered in said therapeutically effective dose.

* * * * *